United States Patent [19]

Bragg

[11] 3,719,904

[45] March 6, 1973

[54] CIRCUIT ARRANGEMENT FOR REDUCING SPURIOUS SIGNALS PICKED UP BY TRANSMISSION LINE

[75] Inventor: Eric James William Bragg, Harrow, England

[73] Assignee: The Post Office, London, England

[22] Filed: Sept. 15, 1970

[21] Appl. No.: 72,381

[30] Foreign Application Priority Data

Sept. 19, 1969 Great Britain..................46227/69

[52] U.S. Cl. ....................................333/12, 178/69 B
[51] Int. Cl. ................................................H04b 3/28
[58] Field of Search .....333/12; 179/78, 174; 178/69, 178/69 B

[56] References Cited

UNITED STATES PATENTS

| | | | |
|---|---|---|---|
| 2,338,399 | 1/1944 | Bingley | 178/69 |
| 3,518,577 | 6/1970 | Baum | 333/12 |

*Primary Examiner*—Herman Karl Saalbach
*Assistant Examiner*—Marvin Nussbaum
*Attorney*—Hall & Houghton

[57] ABSTRACT

This Specification describes circuit arrangements for reducing spurious signals picked up by a coaxial transmission line in which a sample of the signals picked up is derived from the outer screen of the line and after inversion in an amplifier is applied as a current to the central conductor of the line. The outer screen is connected to ground through a potentiometer from the wiper of which an adjustable signal is picked off for effecting the compensation. The amplifier, which includes transistors and may have a field effect transistor input stage, is connected to the wiper of the potentiometer through an a.c. coupling circuit having a time constant of several seconds.

10 Claims, 3 Drawing Figures

INVENTOR
ERIC J. W. BRAGG
BY Hall & Houghton
ATTORNEY

ERIC J W BRAGG

INVENTOR

BY Hall & Haughton

ATTORNEY

CIRCUIT ARRANGEMENT FOR REDUCING SPURIOUS SIGNALS PICKED UP BY TRANSMISSION LINE

This invention relates to circuit arrangements for reducing spurious signals picked up by a transmission line.

In the transmission of broad-band signals from one place to another it is usual to use a transmission line of coaxial construction. With coaxial cable it is common practice, for safety and other considerations, to ground the outer conductor of the cable at the sending and receiving ends of each section of cable. At frequencies above a few tens of kHz, the outer conductor acts as a screen for the inner conductor but with decreasing frequency the screening becomes progressively less effective, so that hum and low-frequency interference can be induced into the inner conductor and hence produce an interfering voltage at the receive terminal. Currents can also flow in both inner and outer conductors due to differences of ground potential between the grounds at the two ends of the cable. In systems which have signal components extending down into this low frequency region, for example in video transmission of television, it is important that these interfering signals be reduced to an acceptable level. Earlier methods for obtaining this reduction have included the use of differential amplifier arrangements with their attendant difficulties, and a system in current use which is a wholly passive device and can be considered as a bridge network. In this latter device a voltage proportional to the current in the outer conductor is inverted by a transformer and added to the combined transmitted and interfering signals in the inner conductor in such magnitude and phase as to result in near-zero interfering current flowing in the receive-terminal load. This method can be made very effective over a narrow band of frequencies which is determined by the design of the transformer. However, when the transformer is optimized for suppression of mains-frequency interference, it is much less effective in suppressing the higher harmonics of the mains supply frequency and the very low frequencies arising from switching transients.

It is an object of the present invention to reduce the spurious signals whilst alleviating at least partly the disadvantages outlined above.

According to the present invention there is provided a circuit arrangement for reducing spurious signals picked up by a coaxial transmission line having an inner conductor and an outer screen, including resistive means connected between the outer screen and ground, an inverting amplifier connected to the resistive means to derive therefrom a voltage proportional to the current flowing in the outer screen due to the spurious signals and to produce a compensating current, and means for feeding the compensating current to the inner conductor so as to reduce the spurious signal currents in the receive station equipment.

In order that the invention may be fully understood and readily carried into effect it will now be described with reference to the accompanying drawings, of which:

Figure 1:
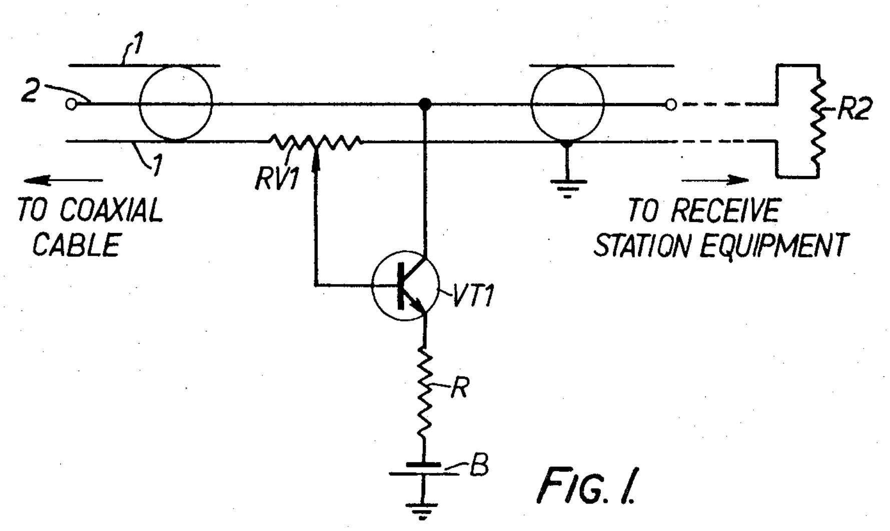
FIG. 1 is a diagram of a basic circuit arrangement according to one example of the invention.

In FIG. 1 the transmission line is shown as a coaxial cable having an outer conductor 1 grounded at the remote transmitting end (not shown) and a central inner conductor 2. The coaxial cable continues to the left of the Figure and is connected to a transmission arrangement, not shown. In the receiving arrangement the signal responsive equipment which may, for example, include an amplifier, is represented by the resistor R2 which is matched to the impedance of the line, the signal being applied with respect to ground to the resistor R2. The outer conductor 1, which is grounded at the transmitting equipment, is connected through the resistive track of potentiometer RV1 to ground and the wiper of the potentiometer RV1 is connected to the base electrode of a transistor VT1. The emitter electrode of the transistor VT1, which is of the N.P.N. type, is connected through resistor R to the negative terminal of a battery B, the positive terminal of which is connected to ground. The collector electrode of the transistor VT1 is connected directly to the central inner conductor 2 of the line.

In operation of the arrangement of FIG. 1 the potentiometer RV1 is adjusted so that the spurious signal voltage applied to the base of transistor VT1 is of such an amplitude that it causes a collector current of the correct magnitude and sense that will cancel the spurious signal current in the terminating resistor R2.

If the spurious signal voltage induced into the conductors of the transmission line is $e$, the longitudinal impedances of the outer conductor 1 and the inner conductor 2 are respectively Z1 and Z2, the impedance of the track of the potentiometer RV1 is Z3 and the proportion of which measured from the grounded end picked off by the wiper is $n$, then it can be shown that if $n$ is adjusted so that $1/n.Gm\ (z1 + z3) = z3(Rs + z2)$ where $Gm$ is the mutual conductance of the transistor VT1 and Rs is the impedance of the transmitting source then the spurious signal is exactly cancelled out. This equation resembles that for a balanced impedance bridge.

In contrast to prior art arrangements that use differential amplifiers, an arrangement according to the invention introduces negligible signal loss and thus produces only a small degradation in signal to noise ratio. Moreover, the circuit arrangement may be entirely external to the rest of the receiving station equipment and the latter can be connected between the inner conductor 2 and ground in the usual manner. In contrast with the bridge arrangement, the arrangement according to this invention does not suffer from the bandwidth restrictions imposed by the inverting transformer. The transistor amplifier is required to pass only the spurious signals and its bandwidth may be restricted accordingly, for example, to the low frequencies most likely to occur and in this way any degradation in signal to noise ratio, due to added noise, produced by the introduction of the circuit is kept to a small amount.

In practice the circuit arrangement shown in FIG. 1 would probably need several refinements depending on the practical requirements of its use. Preferably the input to the transistor VT1 would be by a.c. coupling having a time constant of at least one second and preferably some tens of seconds. Such a long time constant is required to ensure that a circuit is effective for very low frequencies which may occur in the spurious signals, and to provide this very long time constant the transistor VT1 may be replaced by a field effect transistor or a multi-stage amplifier using one or more field effect devices. The use of a.c. coupling of the input to the transistor reduces the problems of the d.c. operating conditions of the transistor by isolating unwanted voltages caused by direct current flowing in the transmission line. In addition, consideration has to be given to restricting the upper frequency of signals that are allowed to pass through the transistor amplifier as a precaution against the introduction of distortion of the signal transmitted along the transmission line. This signal may be, for example, a television signal and at the input to a receiving stage the amplitude of the signals in the upper part of the video frequency spectrum is low so that care has to be taken to ensure that any noise generated is at a sufficiently low level for the overall system to meet the requirements of high quality television links.

Figure 2:
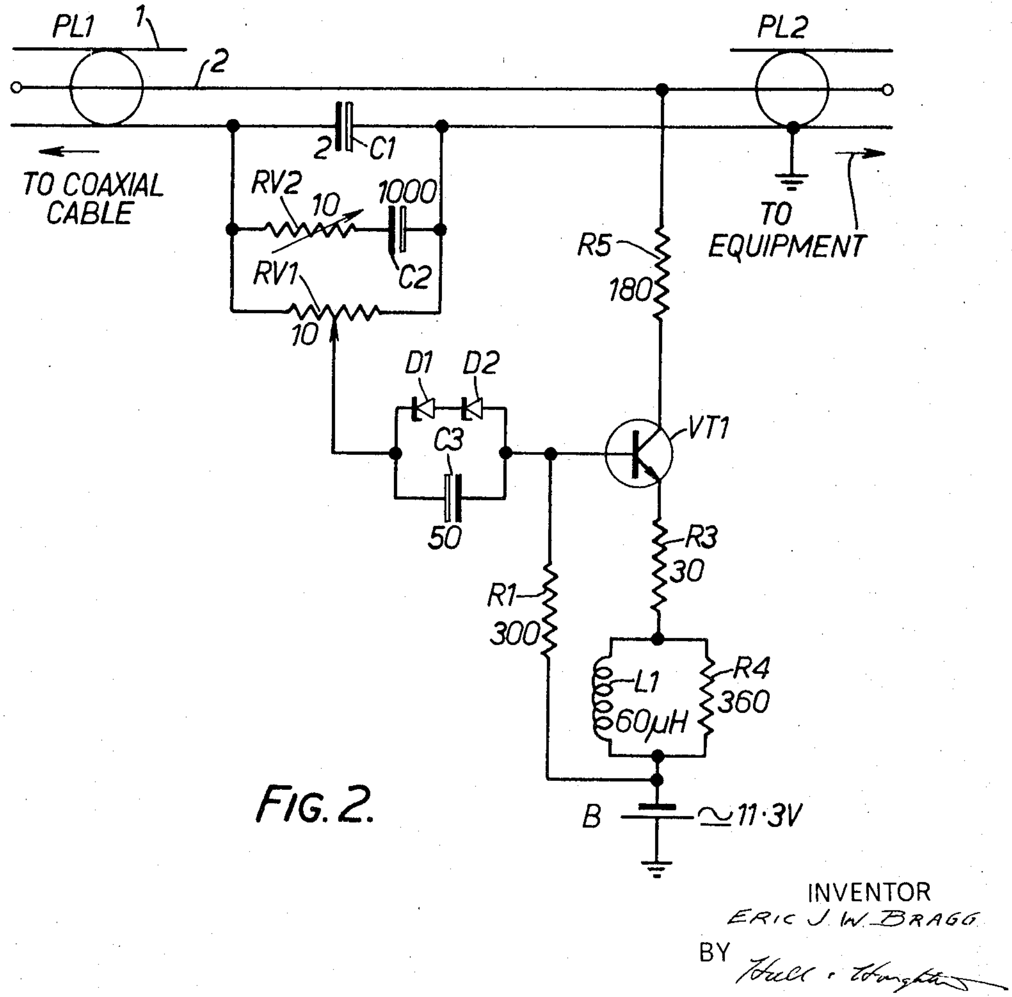
FIG. 2 shows a practical circuit based on the arrangement of FIG. 1.

In the practical version of the arrangement shown in FIG. 2, components which are the same as in FIG. 1 carry the same references. In order to reduce the response of the amplifier to higher-frequency signals, the track of potentiometer RV1 is shunted by capacitor C1. The wiper of the potentiometer RV1 is connected to the base electrode of transistor VT1 through a network consisting of zener diodes D1 and D2 in series, shunted by capacitor C3. The diodes D1 and D2 are used to set the base voltage of VT1 and the capacitor C3 is included as a means for reducing low-frequency noise generated across the diodes. The combination D1, D2 and C3 constitutes an overshoot network and this, together with the variable undershoot network RV2 and C2, is used to compensate for the frequency dependence of the ratio of the spurious signal currents in the inner and outer conductors 2 and 1 of the cable.

The battery B is of approximately 11.3 volts and has its positive terminal connected to earth and its negative terminal connected through resistor R1 to the base of the transistor VT1 and also through the parallel combination of inductor L1 and resistor R4 and then resistor R3 to the emitter of transistor VT1. The collector of transistor VT1 is connected from resistor R5 to the central conductor 2 of the transmission line. The inductor L1 in conjunction with resistor R3 and R4 serves to restrict the gain of the amplifier at higher frequencies so as to reduce the high frequency noise which would otherwise be fed by it to the central conductor 2. The resistor R3 provides negative feedback for the transistor VT1 and controls its collector current. The resistor R5 is used to restrict the dissipation of transistor VT1.

Figure 3:
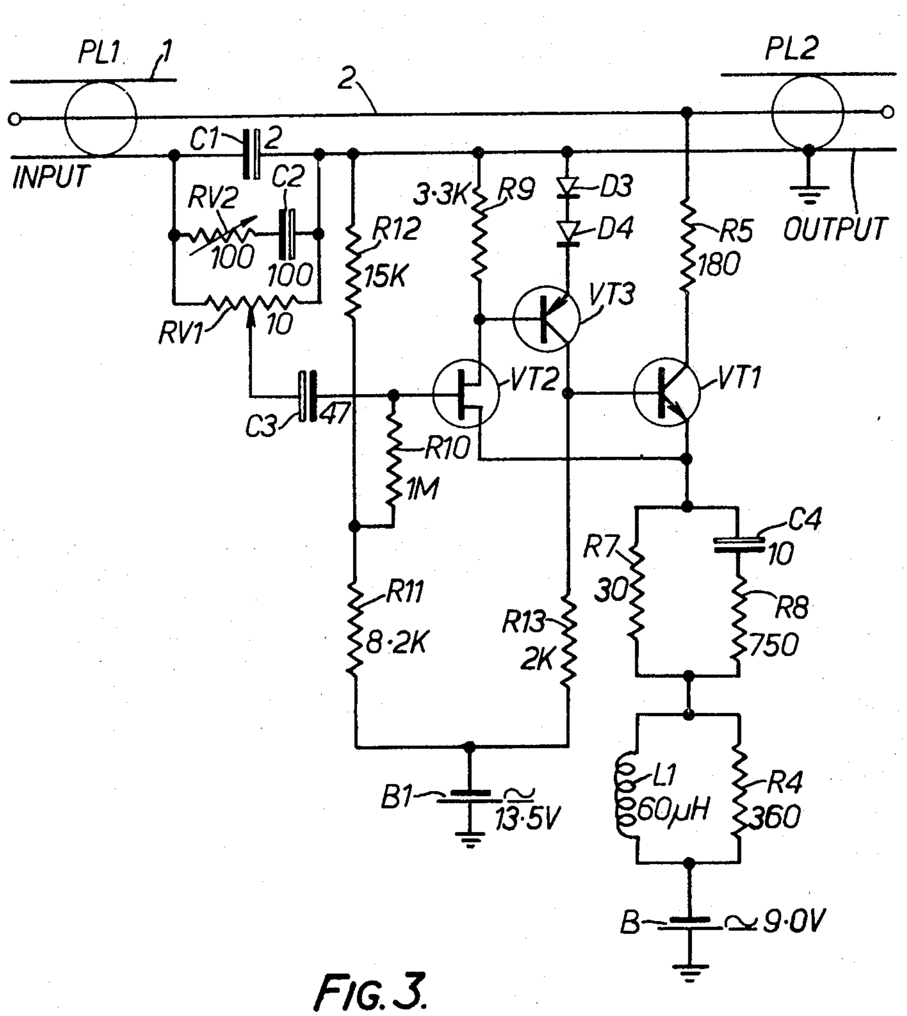
FIG. 3 shows a development of the circuit of FIG. 2.

FIG. 3 shows a development of the circuit of FIG. 2 having an amplifier with a field effect transistor input stage VT2 and overall negative feedback to increase the input impedance of the circuit. In this Figure the components which correspond to those of FIG. 2 have the same references, although not necessarily the same values. The signal picked off by the wiper of potentiometer RV1 is applied by capacitor C3 to the gate of field effect transistor VT2. The gate electrode has a resistor R10 which is connected to the junction of resistors R11 and R12 providing an appropriate bias potential. The drain electrode of transistor VT2 is connected to the base of a transistor VT3 via load resistor R9 to ground. The source electrode of transistor VT2 is connected directly to the emitter of transistor VT1. The emitter electrode of transistor VT3 is connected to ground through diodes D3 and D4 in series, these diodes providing the emitter bias voltage for the transistor VT3. The collector of transistor VT3 is connected to the base of transistor VT1 and via load resistor R13 to the negative terminal of battery B1 which is also connected to one end of resistor R11. The positive terminal of the battery B1 is connected to ground. The emitter and collector circuits of the transistor VT1 are the same as in FIG. 2 except that the resistor R3 is replaced by resistor R7 connected in parallel with the series combination of resistor R8 and capacitor C4. The voltage of the battery B is approximately 9 volts in this example.

The naturally high input impedance of the field effect transistor VT2 is enhanced by the negative feedback provided by the connection of its source to the emitter of transistor VT1, the impedance being sufficiently high to provide, in conjunction with the blocking capacitor C3, a time constant o f several tens of seconds. The amplified output signals from the drain of transistor VT2 is applied to the base of transistor VT3 where it is further amplified and applied to the base of transistor VT1. As with the example of FIG. 2 the transistor VT1 provides a current of such magnitude and sense as to cancel the spurious signal current in the receive-station equipment. The potentiometer formed by resistors R11 and R12 sets the gate voltage for the field effect transistor VT2 and, therefore, provides a control of the collector current of the transistor VT1. The series combination of resistor R8 and capacitor C4 included in the emitter impedance of the transistor VT1 forms an overshoot network which, in conjunction with the undershoot network formed by variable resistor RV2 and capacitor C2 in series, serves to provide compensation for the fact that the ratio of spurious signal currents in the inner and outer conductors of the line is dependent on the frequency of the currents.

The spurious signals most likely to be induced into the transmission line are mains hum and its harmonics and switching transients. Circuits of the type described above have been found to provide better performance in the suppression of such spurious signals than previously proposed arrangements. The insertion loss introduced by the circuits to video signals is inherently very small which can be an advantage where signal to noise ratio is a limiting factor.

In the above described examples of the invention it may be advantageous to connect a resistor of about 1.5 ohms in parallel with the resistive track of the potentiometer, or otherwise provide a low value of resistance, say 1 ohm, in the connection of the outer screen to ground; this modification can simplify the adjustment of the potentiometer when setting up the correct value of compensating current.

Although batteries are used in the examples described it will be clear that any other suitable d.c. power supply could be used providing it does not introduce an unacceptable amount of noise into the system.

Although the invention has been described with reference to specific examples it will be apparent to those skilled in the art that other arrangements based on the bridge principle used in the present invention may be constructed.

What is claimed is:

1. A circuit arrangement for reducing spurious signals picked up by a coaxial transmission line having an inner conductor and an outer screen connected directly to a following signal transmission path, the circuit arrangement including resistive means connected from ground to the outer screen, adjacent the connection to the following signal transmission path, an inverting amplifier connected to the resistive means to derive therefrom a voltage proportional to the current flowing in the outer screen due to the spurious signals and to produce a compensating current, the amplifier including an amplifying element with a single output connection, the connection being from the output electrode to the inner conductor for the derivation of the supply current for the electrode therefrom and the application of the compensating current to the inner conductor where it is connected to the following signal transmission path so as to reduce the spurious signal current in the following signal transmission path.

2. "A circuit arrangement for reducing spurious signals picked up by a coaxial transmission line having an inner conductor and an outer screen the inner conductor being connected directly to a following signal transmission path, the circuit arrangement including resistive means connected between the outer screen and ground, an inverting amplifier connected to the resistive means to derive therefrom a voltage proportional to the current flowing in the outer screen due to the spurious signals and to produce a compensating current, and means for feeding the compensating current to the inner conductor at a position adjacent to the connection of the resistive means to the outer screen so as to reduce the spurious signal currents in the following signal transmission path, in which the resistive means comprises a potentiometer having a resistive track and wiper of which the track is connected from the outer screen to ground and the wiper is connected to the input of the inverting amplifier, whereby the compensating current can be adjusted by adjustment of the position of the wiper.

3. An arrangement according to claim 2, in which the amplifier includes a transistor of which the collector is connected to the center conductor, the emitter is connected to a d.c. supply and the base is coupled to the wiper of the potentiometer.

4. An arrangement according to claim 3, in which the base electrode of the transistor is coupled to the wiper of the potentiometer through an a.c. coupling circuit having a time constant greater than one second.

5. An arrangement according to claim 4, in which the a.c. coupling circuit has a time constant of greater than ten seconds.

6. An arrangement according to claim 5, in which the amplifier includes a field effect transistor input stage and the a.c. coupling circuit is connected from the wiper of the potentiometer to the gate electrode of the field effect transistor.

7. An arrangement according to claim 6, in which the amplifier includes a negative feedback circuit thereby to increase the input impedance of the field effect transistor.

8. An arrangement according to claim 2, in which the amplifier includes one or more frequency dependent networks for compensating for variation in the ratio of spurious signal currents induced in the inner and outer conductors of the line with frequency.

9. An arrangement according to claim 2, including means for attenuating signals of relatively high frequency which would otherwise be fed by the amplifier to the central conductor and cause distortion of the signals to be transmitted by the line.

10. An arrangement according to claim 2, in which the transmission line is used for transmitting television or video signals.

* * * * *